Figure 1:
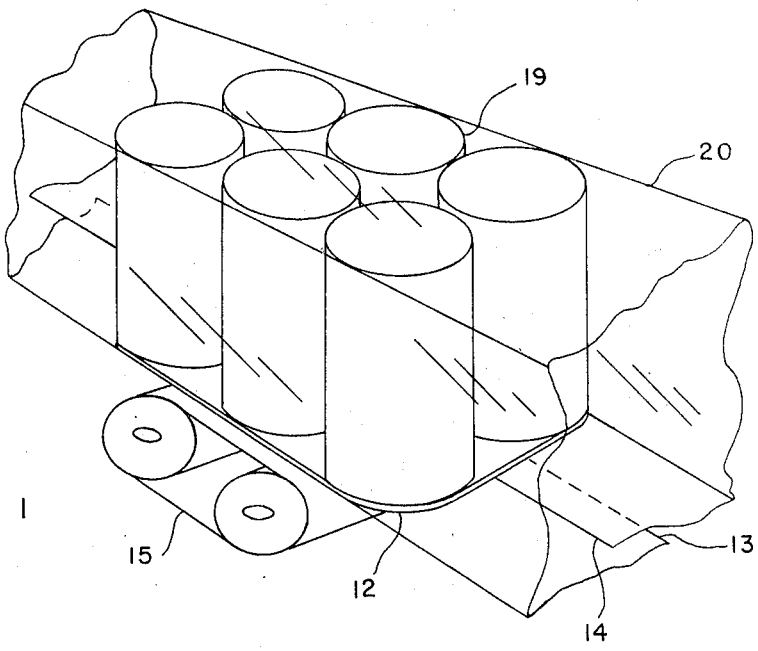
Figure 3:
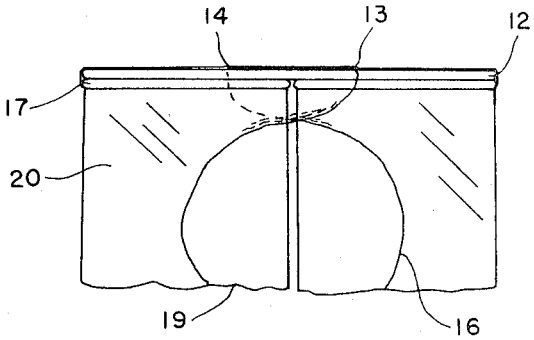
Figure 2:
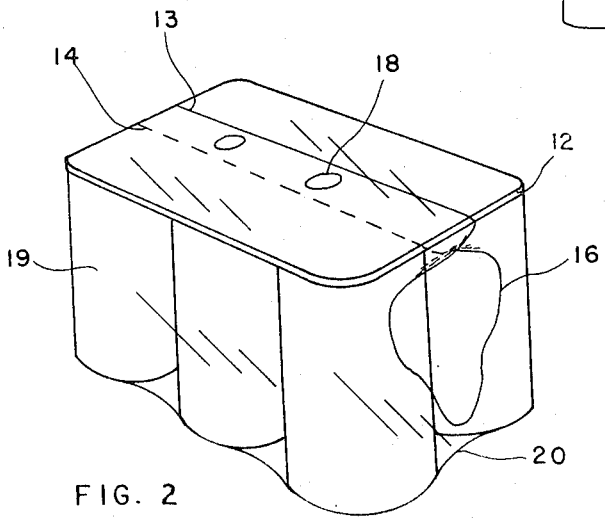
Figure 4:
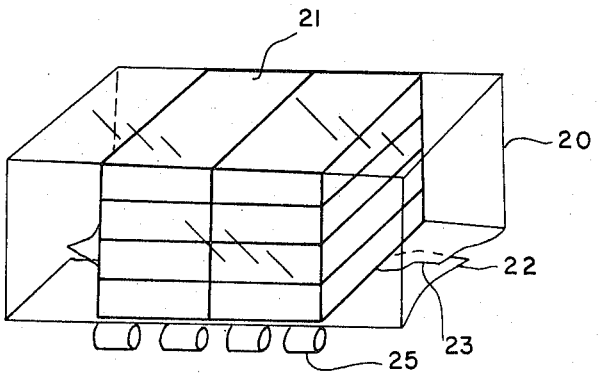
Figure 5:
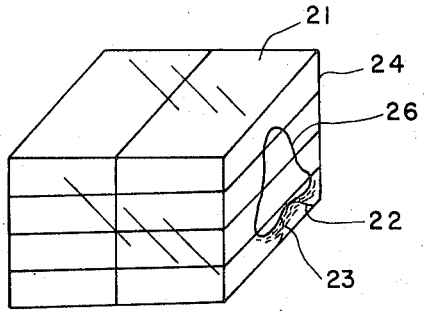
Figure 6:
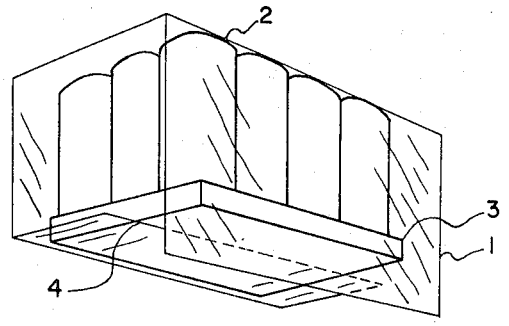
Figure 7:
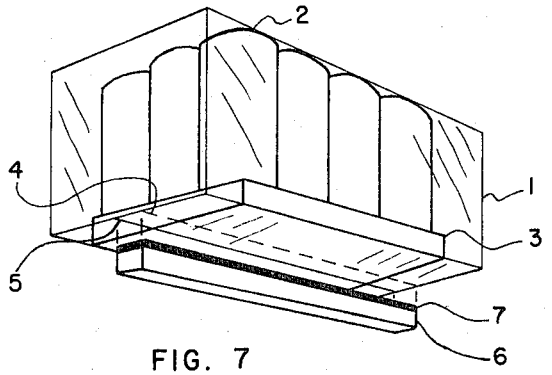
Figure 8:
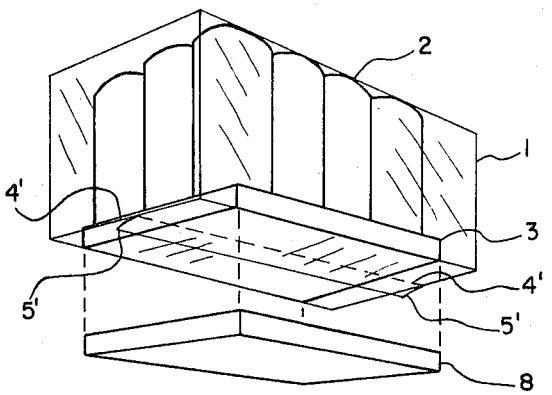
Figure 9:
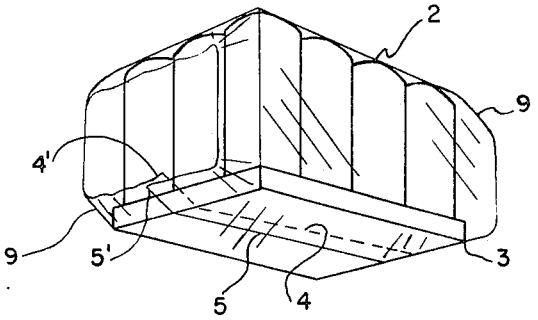
Figure 10:
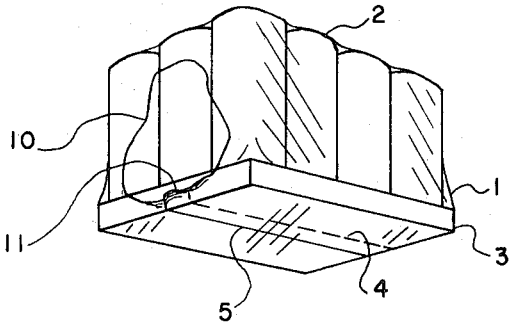

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900 O.G. 1231

T900,020

SLEEVE-WRAPPED PACKAGE AND METHOD OF PREPARING SAME

John Quincy Britt and William Owrey Griffiths, Greenville, and Milton Albert Howe, Jr., Spartanburg, S.C., assignors to W. R. Grace & Co., Duncan, S.C.

Continuation of application Ser. No. 786,028, Dec. 23, 1968. This application Apr. 21, 1971, Ser. No. 136,164

Int. Cl. B65d *65/16, 71/00, 85/62*

U.S. Cl. 206—65 S

4 Sheets Drawing. 7 Pages Specification

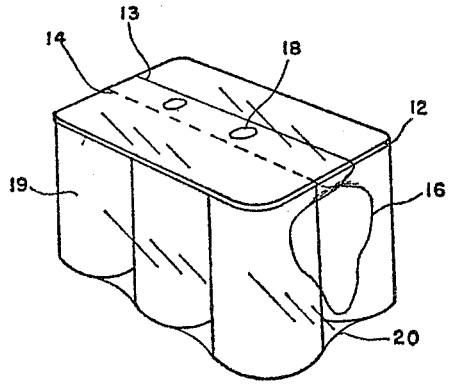

A package comprising at least one article enclosed in an open ended sleeve of shrinkable material can be prepared by overlapping the opposed ends of a sheet of film to form a tube or sleeve in which the article is positioned, the ends of the tube extending beyond the ends of the article. Only that portion of the seam which is adjacent to a lateral surface of the article is sealed. After the partial sealing, the tubing is heat shrunk about the article leaving the end openings of the tube reduced in size. The portions of the seam adjacent the ends of the article which have not been sealed terminate in the periphery of the openings and form convenient tear tabs.

SLEEVE-WRAPPED PACKAGE AND METHOD OF PREPARING SAME

Original Filed Dec. 23, 1968 4 Sheets-Sheet 1

INVENTORS:
JOHN Q. BRITT
WILLIAM O. GRIFFITHS
MILTON A. HOWE, JR.
BY: William D. Lee, Jr.
ATTORNEY

SLEEVE-WRAPPED PACKAGE AND METHOD OF PREPARING SAME

Original Filed Dec. 23, 1968 4 Sheets-Sheet 2

INVENTORS:
JOHN Q. BRITT
WILLIAM O. GRIFFITHS
MILTON A. HOWE, JR.
BY: William D. Lee, Jr.
ATTORNEY

SLEEVE-WRAPPED PACKAGE AND METHOD OF PREPARING SAME

Original Filed Dec. 23, 1968 4 Sheets-Sheet 3

INVENTORS:
JOHN Q. BRITT
WILLIAM O. GRIFFITHS
MILTON A. HOWE, JR.
BY: William D. Lee, Jr.
ATTORNEY

SLEEVE-WRAPPED PACKAGE AND METHOD OF PREPARING SAME

Original Filed Dec. 23, 1968 4 Sheets-Sheet 4

INVENTORS:
JOHN Q. BRITT
WILLIAM O. GRIFFITHS
MILTON A. HOWE, JR.
BY: William D. Lee, Jr.
ATTORNEY